United States Patent Office 3,205,252
Patented Sept. 7, 1965

3,205,252
THIOPHOSPHONOUS ACID ESTER INSECTICIDES
Thomas Mason Melton, Richmond, Va., assignor to Socony Mobil Oil Company, Inc., a corporation of New York
No Drawing. Filed Mar. 26, 1963, Ser. No. 267,938
6 Claims. (Cl. 260—461)

This invention relates to and has for its object new insecticidal compositions. More particularly, the present invention is concerned with compounds of the formula

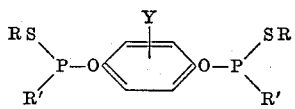

where R and R' are lower alkyl groups, i.e., methyl, ethyl, propyl, butyl, amyl, or hexyl groups, and Y is hydrogen, lower alkyl, halogen, or nitro groups. It will be understood that more than one Y group, either the same or different, can be substituted for the hydrogen on the aryl portion and be present thereon at the same time. It is intended that such combinations will be within the scope of the present invention. It is further intended that similar compounds where the aryl oxygens are ortho or meta to each other (that is, where the dihydroxy compound is pyrocatechin or resorcinol, respectively) will fall within the invention.

These new compounds can be prepared by methods which are well known in this art. They may be obtained from the appropriate dihydroxybenzene and S-alkyl alkylphosphonous thiochloride, substantially in accordance with the following scheme:

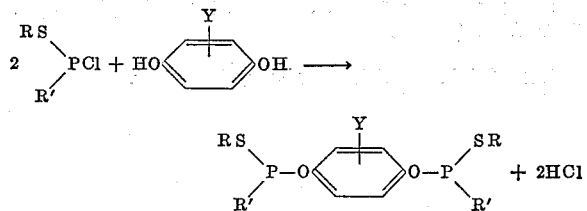

where Y, R and R' have the above meaning.

The new compounds are effective insecticides at concentrations of from about 0.01% to about 1% of the total weight of a given formulation. This range, however, is not to be thought of as limiting. Under ideal conditions of weather and lack of any pest resistance, less than the stated minimum may be effective. Furthermore, while generally more than 1% will be in excess of the amount needed, such things as adverse weather conditions, pest resistance and the like may make it necessary to use more than that quantity.

The compounds may be applied per se, but this is generally impracticable because of the small amount required for effective pest control. For this reason, the compounds preferably are applied to the insect-bearing host in the form of a liquid or solid formulation containing a minor amount of the active compound. The new compounds are, in most instances, substantially water insoluble, and they may be formulated with water and a small amount of a surface-active agent such as Tween-20 (polyoxyethylene sorbitan monolaurate) and the like. Alternately, any insoluble members may be formulated with water, a small quantity of an inert, non-phytotoxic, volatile organic solvent, such as acetone or methyl ethyl ketone, and a surface active agent. Some solid carriers which may be mentioned are chalk, bentonite, attapulgite, clay, ground walnut hulls, vermiculite, and the like. Any of the members which may be water soloble can be dissolved in water, or, if desired, in water containing a small portion of a surface-active agent.

The formulations are applied in known ways. In the case of liquids, spray methods may be used to treat plants, in which cases the plants are sprayed to liquid run-off. Ground pests may be treated by applying the formulation, liquid or solid, directly to the ground, followed by drenching or plowing and disking. Solid formulations may be used to dust plants in the usual manner.

The following examples are illustrative of the compounds of this invention, but the invention is not to be limited thereby. Example 1 is merely illustrative of the preparation of one of the intermediates employed in the production of the claimed compounds. Parts are parts by weight.

Example 1

Forty-six and seven-tenths parts of $CH_3PCl_2$ was placed in a suitable vessel previously flushed with nitrogen, and in which an atmosphere of nitrogen was maintained during reaction. 304.8 parts of propyl mercaptan was added to the $CH_3PCl_2$ at 25° C. over a period of 45 minutes. After the addition was complete, the reaction mass was allowed to stir for several hours, and then the product was evacuated to 30 mm. of Hg at 50° C. to remove any residual HCl.

Example 2

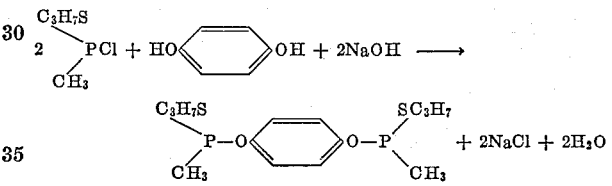

Twenty-seven and eight-tenths parts of hydroquinone was placed in 176 parts of benzene, and the mixture was placed in a suitable reaction vessel in which an atmosphere of nitrogen was maintained. 100 parts of aqueous 20% NaOH was added to the mixture at 25–30° C. The mass was cooled to 5° C. and 78.3 parts of the product of Example 1 was added, with cooling, at 5–10° C. The reaction mixture was warmed to room temperature and the aqueous and organic layers were separated. The water layer was extracted with 44 parts of benzene, this benzene was added to the largest organic body, and the whole body of solvent was washed with 100 parts of aqueous 5% NaOH. The aqueous and organic layers were again separated, and the solvent was removed at 30 mm. of Hg at a final temperature of 100° C. Distillation of the crude material, gave the product with the following properties:
B.P. 171° C. at 0.025 mm. of Hg
Refractive index at 27.5° C., 1.5650
Density at 20°/4° C., 1.22
Calculated: S, 18.30%. Found: S, 18.62%.

Example 3

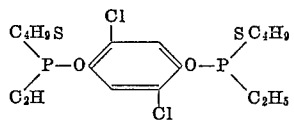

This compound is made from $C_4H_9S(C_2H_5)PCl$ and 2,5-dichlorohydroquinone.

Example 4

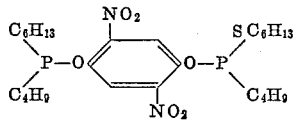

This compound is made from $C_6H_{13}S(C_4H_9)PCl$ and 2,5-dinitrohydroquinone.

*Example 5*

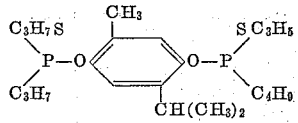

This compound is prepared from $C_3H_7S(C_3H_7)PCl$ and 2-methyl-5-isopropylhydroquinone.

*Example 6*

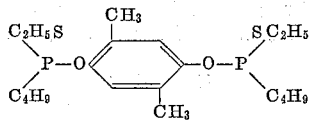

This compound is prepared from $C_2H_5S(C_4H_9)PCl$ and 2,5-dimethylhydroquinone.

I claim:
1. Compounds of the formula

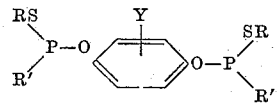

wherein R and R' are lower alkyl and Y is selected from the group consisting of hydrogen, lower alkyl, halogen, and nitro.

2. A compound of the formula

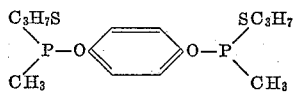

3. A compound of the formula

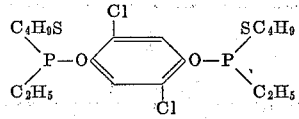

4. A compound of the formula

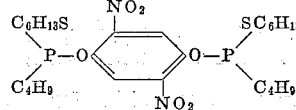

5. A compound of the formula

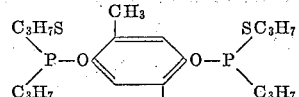

6. A compound of the formula

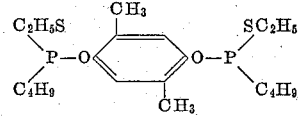

References Cited by the Examiner

UNITED STATES PATENTS

| | | | |
|---|---|---|---|
| 2,234,379 | 3/41 | Martin | 260—461.303 |
| 2,392,841 | 1/46 | Detrick et al. | 260—461.108 |
| 2,967,884 | 1/61 | Dunn et al. | 260—461.110 |
| 3,014,043 | 12/61 | Schegk et al. | 260—461.110 |
| 3,071,609 | 1/63 | Campbell | 260—461.110 |
| 3,112,271 | 11/63 | Calhoun | 260—461.110 |

OTHER REFERENCES

Pudovik, et al.: "Zhur. Obshchel Khim.," vol. 32, pp. 2005–2010 (1962).

CHARLES B. PARKER, *Primary Examiner.*

UNITED STATES PATENT OFFICE
CERTIFICATE OF CORRECTION

Patent No. 3,205,252                      September 7, 1965

Thomas Mason Melton

It is hereby certified that error appears in the above numbered patent requiring correction and that the said Letters Patent should read as corrected below.

Column 1, line 69, for "soloble" read -- soluble --; column 2, lines 15 to 18, the formula should appear as shown below instead of as in the patent:

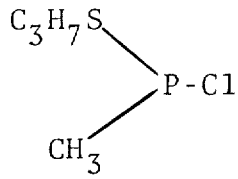

same column 2, lines 29 to 36, the formula should appear as shown below instead of as in the patent:

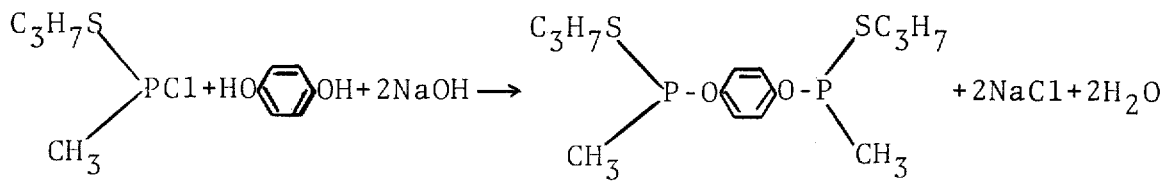

same column 2, line 47, for "largest" read -- larger --; line 52, after "material" strike out the comma; line 54, for "1.22" read -- 1.122 --; lines 57 to 63, the formula should appear as shown below instead of as in the patent:

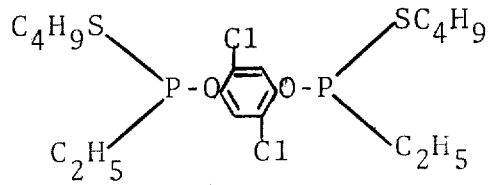

same column, lines 67 to 71, the formula should appear as shown below instead of as in the patent:
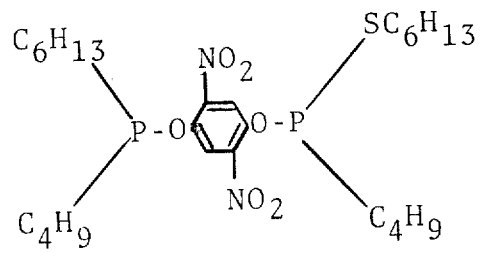
column 3, lines 4 to 9, the formula should appear as shown below instead of as in the patent:
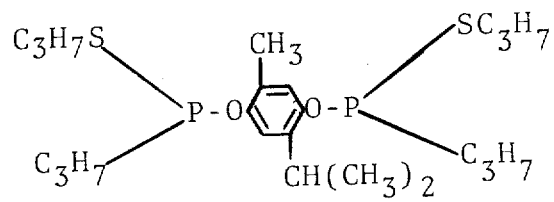
same column 3, lines 15 to 19, the formula should appear as shown below instead of as in the patent:
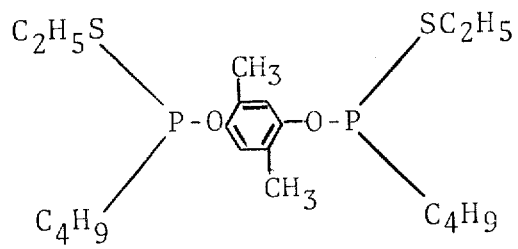
same column 3, lines 25 to 30, the formula should appear as shown below instead of as in the patent:
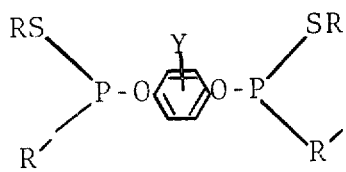

same column 3, lines 37 to 40, the formula should appear as shown below instead of as in the patent:

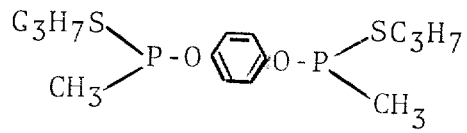

column 4, lines 2 to 5, the formula should appear as shown below instead of as in the patent:

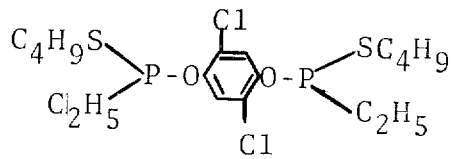

same column 4, lines 8 to 12, the formula should appear as shown below instead of as in the patent:

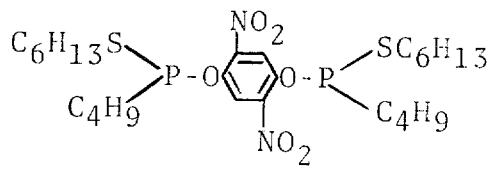

same column 4, lines 15 to 19, the formula should appear as shown below instead of as in the patent:

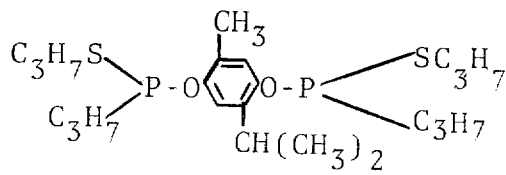

same column 4, lines 21 to 25, the formula should appear as shown below instead of as in the patent:

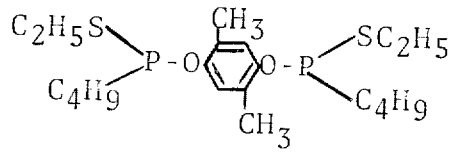

Signed and sealed this 5th day of April 1966.

(SEAL)
Attest:

ERNEST W. SWIDER
Attesting Officer

EDWARD J. BRENNER
Commissioner of Patents